Nov. 28, 1933.  J. MORKOVSKI  1,936,768
TRACTOR HITCH
Filed Jan. 14, 1931   3 Sheets-Sheet 1
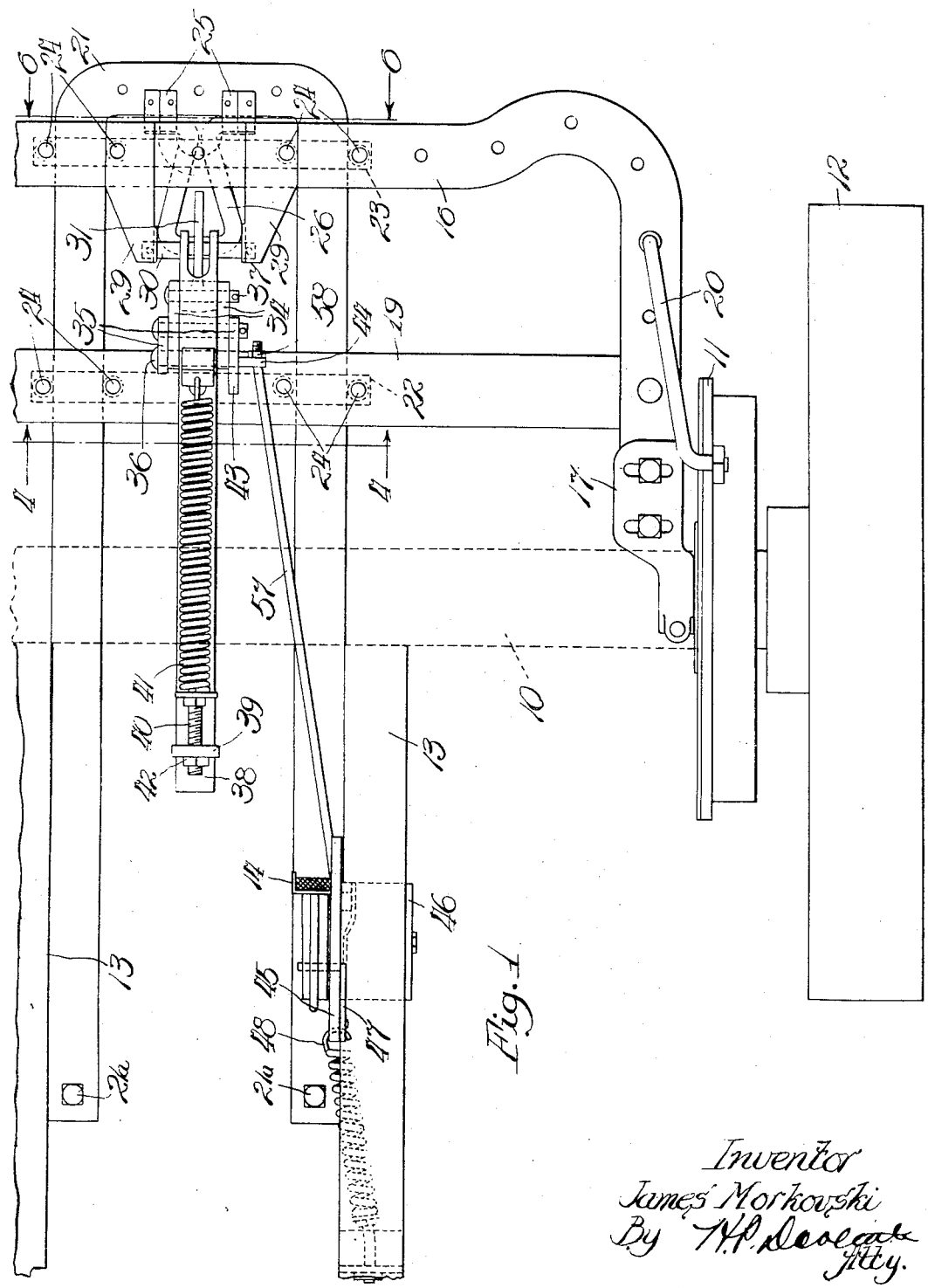
Inventor
James Morkovski
By T.H.P. Doolgate
Atty.

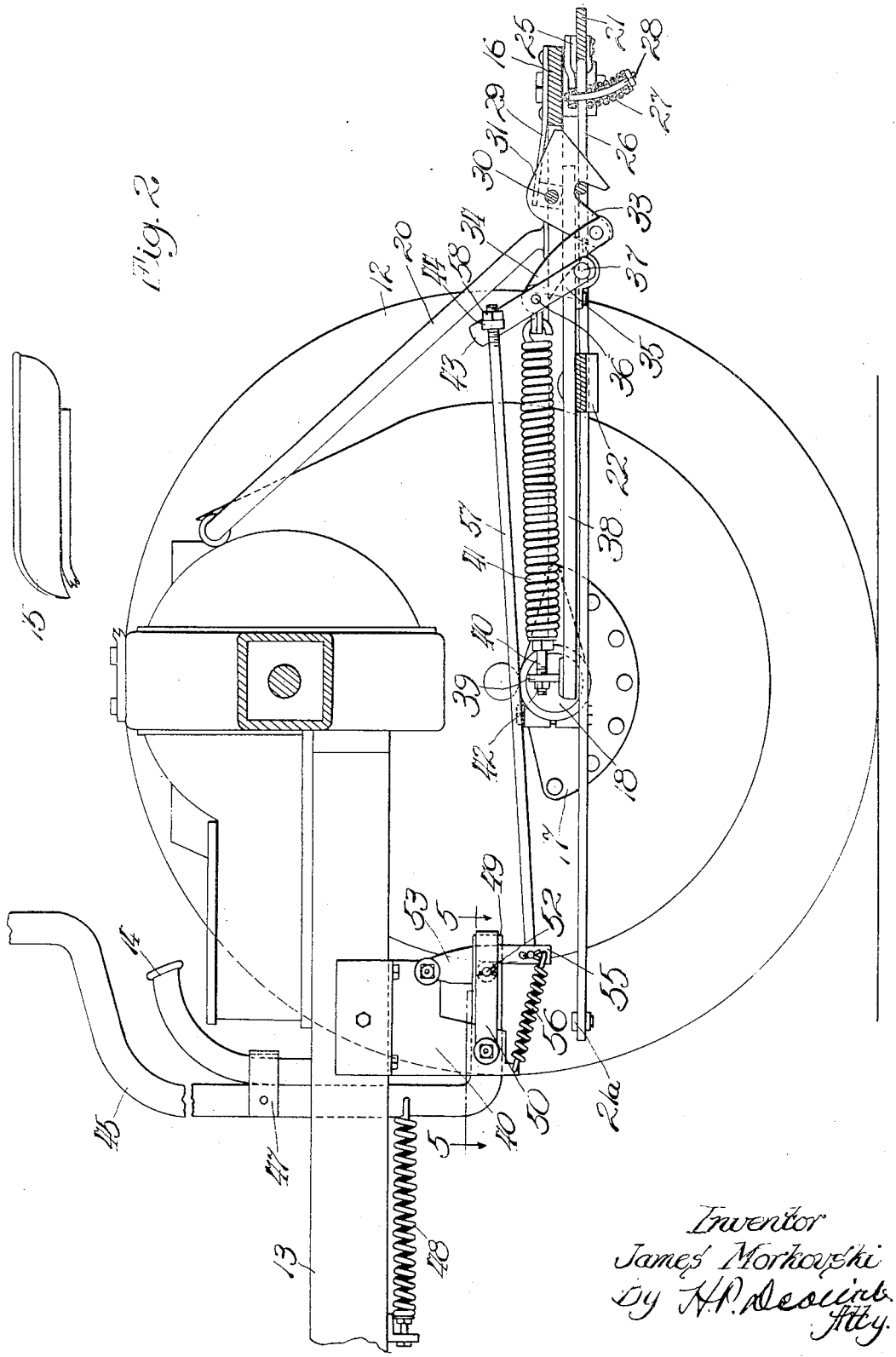

Nov. 28, 1933.  J. MORKOVSKI  1,936,768
TRACTOR HITCH
Filed Jan. 14, 1931   3 Sheets-Sheet 3
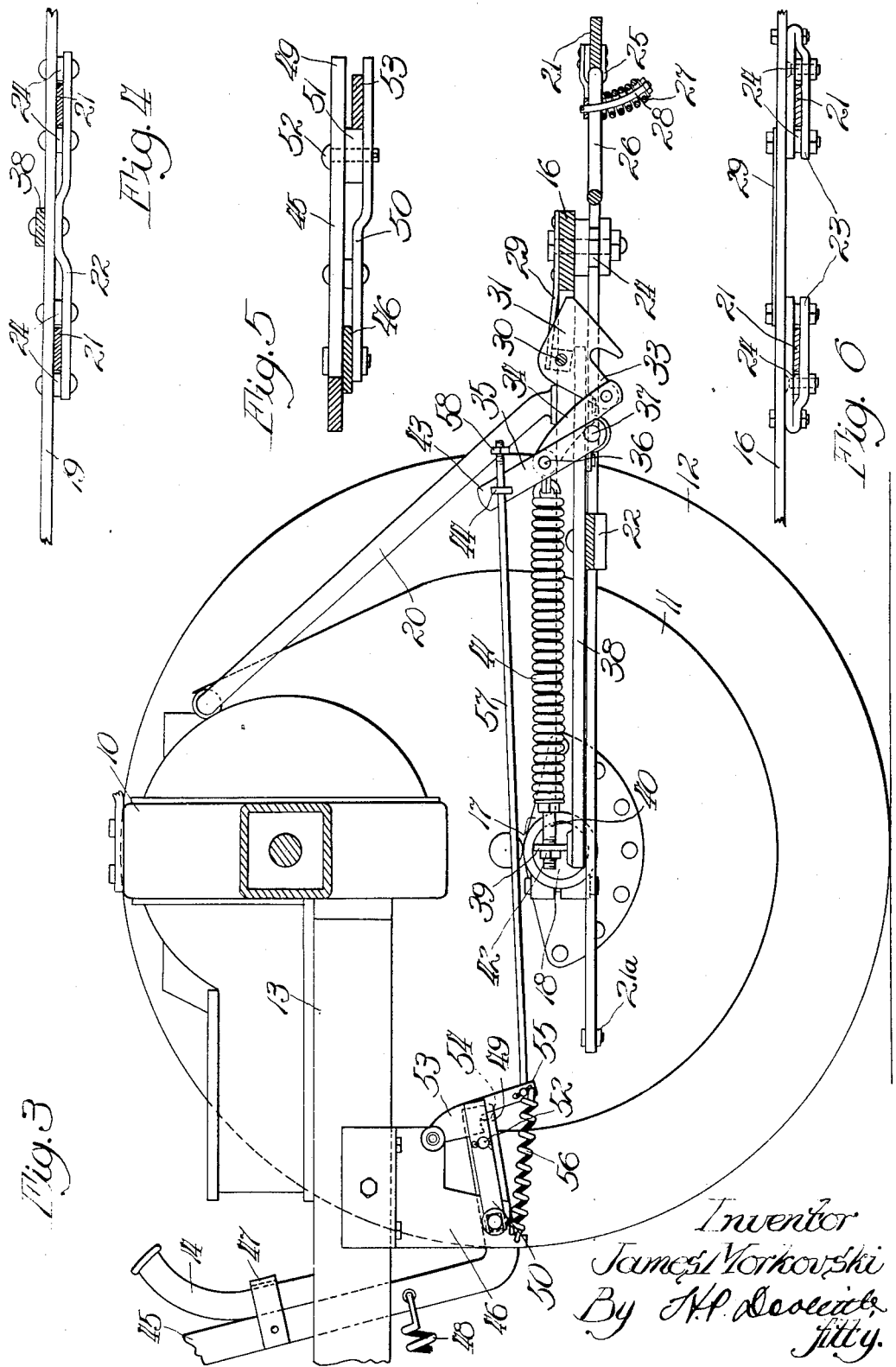

Patented Nov. 28, 1933

1,936,768

UNITED STATES PATENT OFFICE 1,936,768

TRACTOR HITCH

James Morkovski, Canton, Ill., assignor to International Harvester Company, a corporation of New Jersey Application January 14, 1931. Serial No. 508,699

2 Claims. (Cl. 180—14.5)

The present invention relates to draft attachments for tractors and particularly those of the safety or overload release type.

The objects of the invention are to provide a draft connection for tractors which will automatically release the implement, such as a plow, being drawn by the tractor when an obstruction is encountered by the implement, without, however, completely disconnecting the implement and providing for return of the implement to coupled position automatically upon backing up of the tractor. Also, to combine with the draft connection, mechanism for stopping progress of the tractor and to so associate these devices as to permit quick and easy return to operating positions after release thereof in consequence of overload.

Another object is to provide a simplified and easily handled trip controlled throw-out device for the tractor clutch, which will act to instantly throw out the clutch when actuated and be readily restored to a position where it will not interfere with ordinary use of the clutch pedal lever.

The foregoing and other objects and advantages are attained by the organization and details of construction hereinafter described and claimed, and illustrated in the accompanying drawings, where:

Figure 1 is a plan view of a tractor and draft device embodying the invention;

Figure 2 is a longitudinal sectional view of the same from the side;

Figure 3 is a similar view with the draft mechanism in released positions;

Figure 4 is a detail sectional view on the line 4—4 of Figure 1;

Figure 5 is a similar view on the line 5—5 of Figure 2; and,

Figure 6 is a detail sectional view on line 6—6 of Figure 1.

In the present instance the invention has been illustrated in combination with a tractor having a rear end structure comprising a transverse axle housing 10 and depending side housings 11, on the outer sides of which traction wheels 12 are mounted. The axle housing 10 is connected to forwardly extending side sills 13, only one of which is shown in the drawings. It will be understood that the side sills 13 are parallel and support the usual tractor power plant, etc. The tractor is provided with the usual clutch control pedal lever 14 in convenient location to the seat for the operator at 15. The tractor is provided with a rearwardly extending draft frame composed of a U-shaped member 16, the arms of which carry brackets 17 which are pivoted on trunnions 18 secured to the inner sides of the depending housings 11. Intermediate the ends of the arms of the member 16 there is secured a crossbar 19, as best seen in Figure 1. Suspension bars 20 at each side adjustably connect the draft frame to the depending housings 11.

On the draft frame above described there is slidably mounted at the center an elongated, U-shaped drawbar 21, the bight portion of which is normally located just behind the transverse portion of the member 16, and the arms of which extend forwardly under the tractor axle. The arms of the member 21 are preferably mounted on the under side of the members 16 and 19 of the draft frame by means of supporting brackets 22 and 23 secured to the under sides of said bars and spaced therefrom by suitable spacing bolts and sleeves, as at 24, in a manner to provide slide-ways for the arms of the drawbar 21. Stops 21ª on the forward ends of the arms of drawbar 21 are adapted to contact with bracket 22 and prevent complete withdrawal of the drawbar. The inner edge of the bight portion of the drawbar 21 is provided with a pair of bearing brackets 25 which receive the outturned arms of a bail-shaped clevis member 26. This pivoted bail-shaped member is passed upwardly by means of a spring 27 carried on a curved bolt 28 mounted on the drawbar and extending below the clevis member 26. The purpose of this manner of mounting the clevis member will be hereinafter referred to. The transverse portion of the member 16 of the draft frame, at points between the arms of the drawbar 21, has secured to its upper side a pair of rearwardly extending, laterally spaced brackets 29. In the ends of this pair of brackets there is journaled a short shaft 30, to which is secured a clevis hook 31, the bill portion of which extends perpendicularly across the plane of movement of the drawbar 21. At its rear the clevis hook 31 is formed with a downward extension 33 which is pivotally connected to an upwardly and forwardly inclined link 34 which is in turn pivoted to upwardly extending, laterally spaced, inclined links 35 by a pivot bolt 36 which connects the links 35. The lower ends of the links 35 are pivoted on a bolt 37 mounted on the under side of a longitudinally extending bar 38, which is fixedly secured to the cross member 19 of the draft frame. At its forward end, the bar 38 is provided with an upstanding lug 39, through which there is passed a screw-threaded stud or shaft 40 forming an anchoring means for a tensioning spring 41, the other end of which is connected to the bolt 36 connecting the links 34 and 35. A nut 42 on the rear side of the lug 39 and mounted on the screw-threaded shaft 40 serves to adjust the tension of spring 41. The arrangement of the clevis hooks and links, etc. above described forms a spring held toggle lock for the clevis hook 31, as will be understood from inspection of Figures 2 and 3. When a predetermined pull is applied to the bill of hook 31, the toggle formed by links 34 and 35 will be temporarily broken